Figure 1:
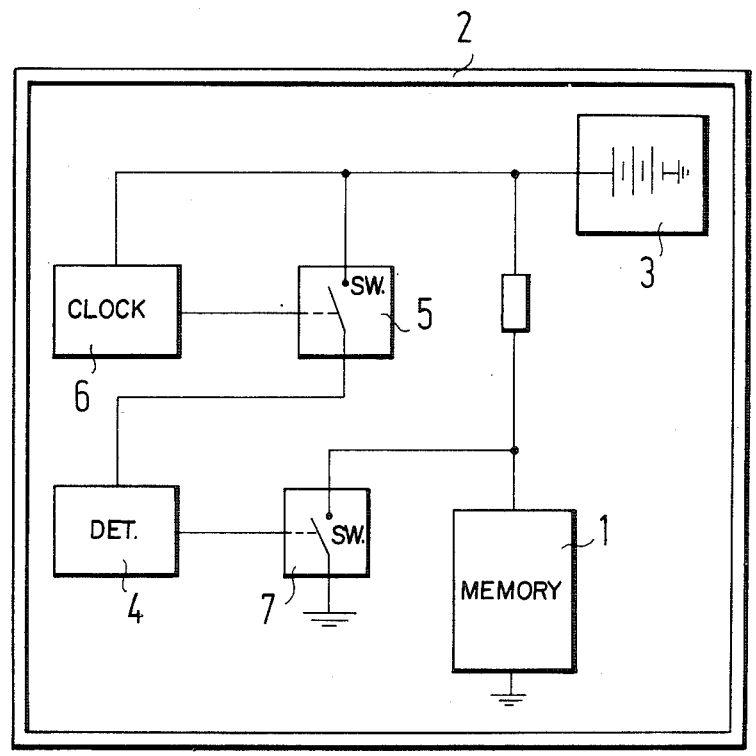

United States Patent [19]

Kaule

[11] Patent Number: 4,783,801

[45] Date of Patent: Nov. 8, 1988

[54] APPARATUS FOR PROTECTING SECRET INFORMATION

[75] Inventor: Wittich Kaule, Emmering, Fed. Rep. of Germany

[73] Assignee: GAO Gesellschaft fur Automation und Organisation mbH, Fed. Rep. of Germany

[21] Appl. No.: 678,284

[22] Filed: Dec. 5, 1984

[30] Foreign Application Priority Data

Dec. 29, 1983 [DE]  Fed. Rep. of Germany ....... 3347483

[51] Int. Cl.⁴ .................. H01L 23/02; H05K 5/02; H04L 9/00
[52] U.S. Cl. .......................................... 380/3; 380/4; 380/52; 307/202.1
[58] Field of Search .................. 128/22.08, 22.09; 235/487, 379, 380, 439; 307/200 A, 202.1; 340/522; 365/218; 380/2, 3, 4, 5, 59, 23, 25, 52

[56] References Cited

U.S. PATENT DOCUMENTS

| | | | |
|---|---|---|---|
| 3,535,560 | 10/1970 | Cliff | 307/296 |
| 3,882,323 | 5/1975 | Smolker | 307/200 A |
| 3,906,460 | 9/1975 | Halpern | 235/439 |
| 3,934,122 | 1/1976 | Riccitelli | 235/380 |
| 4,030,095 | 6/1977 | Dalman | 340/505 |
| 4,092,524 | 5/1978 | Moreno | 235/487 |
| 4,093,946 | 6/1978 | Fowler | 340/505 |
| 4,105,156 | 8/1978 | Dethloff | 235/487 |
| 4,203,153 | 5/1980 | Boyd | 364/200 |
| 4,211,919 | 7/1980 | Ugon | 235/487 |
| 4,295,041 | 10/1981 | Ugon | 235/487 |
| 4,401,976 | 8/1983 | Stadelmayr | 340/522 |
| 4,404,972 | 9/1983 | Gordon et al. | 128/419 PG |
| 4,484,067 | 11/1984 | Obrecht | 235/382 |
| 4,593,384 | 6/1986 | Kleijne | 307/202.1 |
| 4,691,350 | 9/1987 | Kleijne et al. | 380/3 |

FOREIGN PATENT DOCUMENTS

| | | | |
|---|---|---|---|
| 0044725 | 1/1982 | European Pat. Off. | |
| 3023427 | 1/1981 | Fed. Rep. of Germany | |
| 57-8827 | 1/1982 | Japan | |
| 8202274 | 7/1982 | Sweden | 365/218 |
| 8404614 | 11/1984 | United Kingdom | |

*Primary Examiner*—Stephen C. Buczinski
*Assistant Examiner*—Bernarr Earl Gregory
*Attorney, Agent, or Firm*—Bacon & Thomas

[57] ABSTRACT

In order to protect secret information in the electronic storage medium, the storage medium is provided in a housing protected against access. This housing contains one or more detector elements, via which erasure of the memory contents is initiated when unauthorized access is detected. The detector elements are connected with a clock unit which sets these elements into operation for short periods of time at certain time intervals. This clocked operation allows for the energy consumption of the overall arrangement to be reduced many times over without any essential restriction of security.

14 Claims, 3 Drawing Sheets

APPARATUS FOR PROTECTING SECRET INFORMATION

The present invention relates to an apparatus for protecting secret information, comprising a housing in which a storage medium containing the secret information is provided, and a first detector element for detecting unauthorized access to the interior of the housing, the erasure of the secret information being initiated when the detector element reacts, and a battery which supplies energy at least to the detector element and possibly to the storage medium.

It is necessary in many areas of electronic data processing to protect special secret data from access by unauthorized persons. For example, it is usual to apply a secret code to information during transmission in order to protect it from attempted wiretapping. However, the security of the system requires that the secret code be stored so as be protected against access by unauthorized persons.

The same problem arises in identification card systems in which a person's right to access, for example, is established by secret personal data stored in electronic memories. These data and the codes used in decoding processes must also be stored so as to be protected against access.

German Pat. No. 22 24 937 discloses such an apparatus for protecting memory contents. The memory provided with secret information is embedded in a casting compound in which the supply lines for the memory are incorporated in random distribution. When a person attempts to remove the casting compound, the supply lines are interrupted and the memory contents automatically erased.

However, interference voltage or currents which impair the reliable operation of the memory may be induced in the supply lines, which may be as long as several meters. In order to avoid such sources of error, it has been proposed to embed a detector element additionally and only embed its supply lines as protective lines in random distribution, as above. When these protective lines are interrupted or short-circuit, erase information is fed from the detector element to the memory via a connecting line. The entire protective device is supplied by a battery integrated into the arrangement.

The operational reliability of the overall arrangement is thus dependent upon the quality and state of charge of the battery. In order to ensure the functioning of the protective detect, i.e. to prevent its functioning from being impaired by old or worn-out batteries, it is therefore necessary to replace the battery at contain intervals. However, replacing the battery usually involves the erasure of the memory contents, so that the secret information must then be read in again in accordance with the elaborate security requirements.

The time intervals between the servicing phases are shorter the more complex the security precautions are, since more elaborate protection generally consumes more energy.

The known apparatus is consequently restricted to those cases of application in which either relatively simple detector elements are sufficient to detect an unauthorized attempt to gain access, requiring accordingly little energy, or the apparatus is only in operation for relatively short periods.

The problem on which the invention is based is to provide an apparatus by which the operating time of the memory device with the detector elements can be considerably increased without impairment of the protection against unauthorized access.

The solution to this problem is stated in the characterizing part of the main claim.

Advantageous embodiments are the object of the subclaims.

The inventive solution is based on the finding that it is not necessary, contrary to general expectations, to keep the detector elements in operation permanently in order to achieve a sufficient security effect.

By clocking the detector elements, the energy consumption of th overall circuit can be reduced many times over, thereby in turn increasing the service life of the battery many times over. Thus, the length of operation can be prolonged to such an extent that no change of battery is necessary even in the case of permanent operation over a relatively long period. The inventive apparatus is therefore characterized by its high operational reliability lasting for relatively long time periods, combined with a high standard of security.

The various intervals between the periods in which the detector elements are in operation are set in such a way that an unauthorized person cannot have access to the memory contents within these intervals. Non-working intervals of one second and operation lasting 10 ms in each case are generally sufficient to prevent any access from the outside. In this manner, electricity is saved by 99% relative to permanent operation, since the average energy consumption of the clock switchings may be kept negligibly low.

The detector elements are preferably set into operation for intervals of varying length, which may in turn be distributed statistically, thereby further increasing the security of the apparatus.

In a further advantageous embodiment, the erasure of the memory contents is not triggered directly after a reaction of the detector element in operation, but first further detector elements designed to detect different attempts to gain access are switched on. If an attempt to gain access is then ascertained via these further elements, the erasure of the memory contents is initiated. In this way, accidental erasure, for example due to interference signals, can be avoided.

An alternative or an additional measure is provided by the fact that, after the detector element in operation at the moment has responded to an event indicating an attempt to gain access, the element is caused to perform a closer investigation. For this purpose, a more precise evaluation of the signals received as a result of the event may be carried out, for example, in order to obtain details on the cause of the signal triggered. It can then be decided on the basis of this evaluation whether the erasure of the data should be performed and/or whether the further protective circuits should be activated. Such a procedure and the activation of further detector elements may be controlled, for example, by a microprocessor.

In order to provide protection at all times against different attempts to gain access, the detector elements designed to detect different events may be put into operation alternatingly. The selection of the detector elements to be switched on in any particular case can again take place in a statistical sequence.

Extensive protection against unauthorized access may be obtained using the above-mentioned variants, at the same time guaranteeing reliable operation for relatively long periods of time. The clocked operation of the single protective circuits also increases the service life of the entire arrangement many times over, without diminishing its security.

Embodiments and advantageous developments shall be described in more detail in the following with reference to the drawings.

The figures show:

FIG. 1 a schematic view of an inventive apparatus having one detector element

Figure 2:
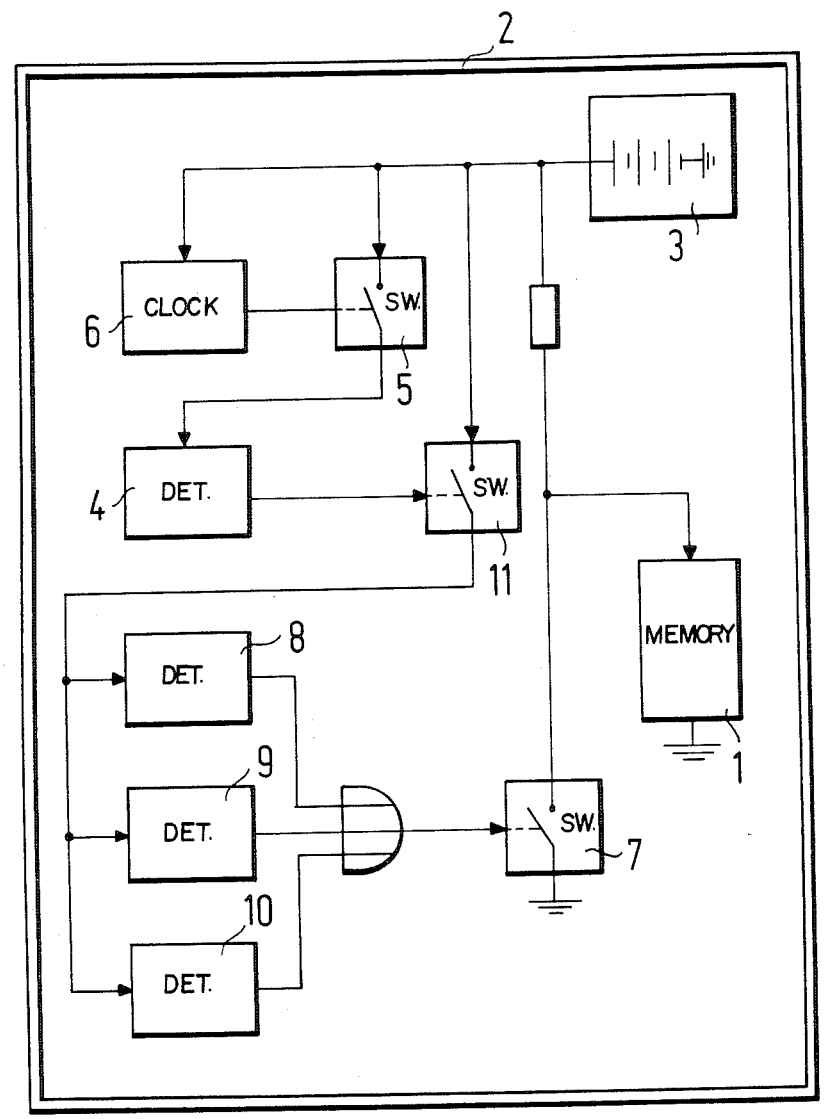
Figure 3:
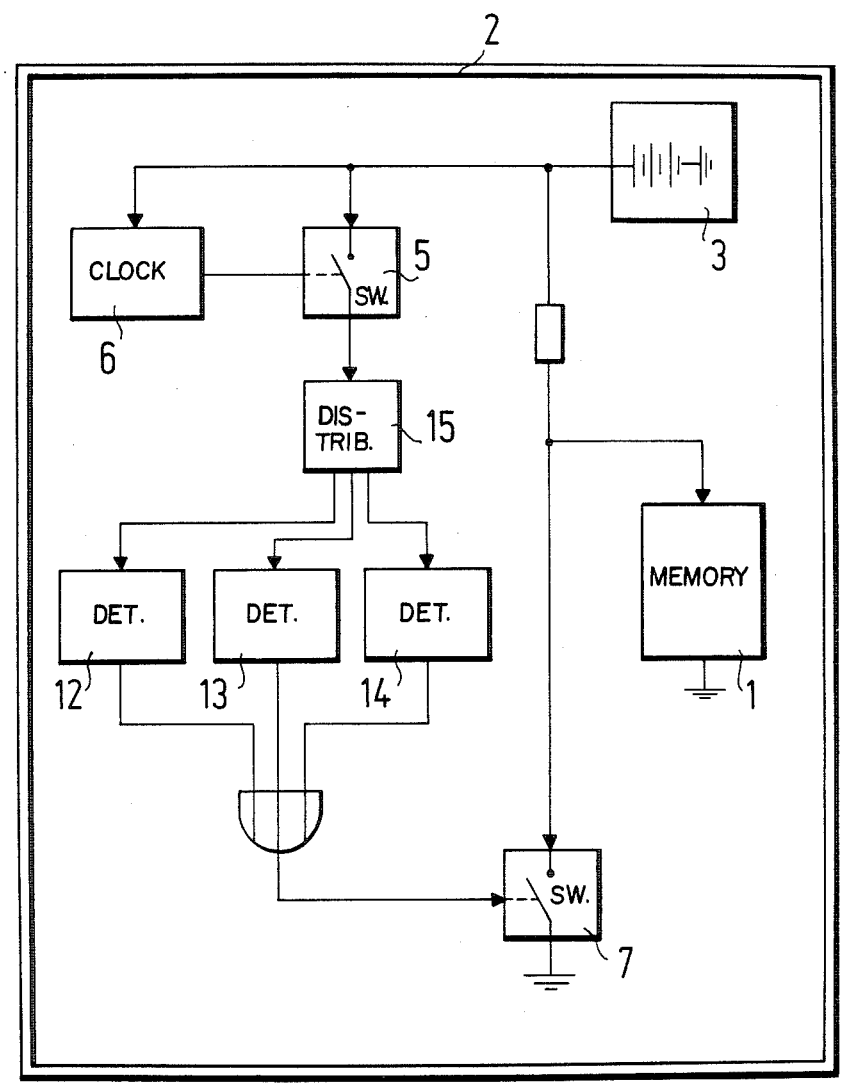

FIG. 2 a schematic view of an inventive apparatus having a plurality of further detector elements which may be triggered by a first detector element FIG. 3 a schematic view of a further inventive apparatus having a plurality of detector elements FIG. 1 shows in a greatly schematized form an example of an inventive apparatus. Memory 1, which contains the secret information, is enclosed along with further components in a closed housing 2 or in a casting compound surrounding the entire arrangement. This housing may contain not only the elements shown in the figures but also further electronic components, for example means for reading out the memory contents and/or comparators for comparing the memory contents with data supplied externally.

A battery 3 supplies memory 1 with the energy necessary for maintaining the stored data. The supply line for this memory can be grounded via a detector element 4 and a switch element 7, thereby erasing the memory contents. The detector element may be a vibration indicator, for example, which detects any violent attempt to penetrate housing 2 and causes the memory contents to be erased. Other detector elements are, for example, a thermometer probe, microphones or one or more nonconductive films integrated into the housing wall or provided on the inside of the housing wall, on which leads are vacuum metallized or etched out. In the latter case, erasure of the memory contents is initiated when these leads are interrupted or short-circuit.

A number of further protective measures which may be used in accordance with the particular requirements at hand are known in the field of the protection of housings.

According to the invention the detector element used at the moment is always set into operation or enabled only for a short period of time at certain intervals. In order to realize this, a clock unit 6 is provided in the housing to interrupt the electricity supply to the detector element at certain intervals by means of a switch element 5 in the example shown.

The timed intervals in which the electricity supply is interrupted depend on the construction and nature of the particular housing at hand, and on the required security standard. When a solid housing is used, timed intervals of approx. 1 second suffice, for example, to prevent any attempted penetration in the meantime.

The particular "operating time" depends in turn on the reaction time, adjustment time, decay time, etc., of the detector element. A detector element generally requires 10 ms to be able to ascertain clearly whether the predetermined general marginal conditions suggest proper handling of the apparatus or whether attempted penetration is taking place or has taken place.

A saving of electricity of 99% for the operation of the detector element results, for example, from the above-mentioned relationship between the timed interval and the particular operating time.

Even higher values may be attained when the interval periods of the clocked operation are different and preferably show statistical distribution, since in this case the average timed interval may even be increased to 3 to 5 s or more, for example, without restricting security.

Such statistical distribution of the interval periods may be realized, for example, by a randomizer connected with the clock unit. An alternative to this would be, for example, to superimpose several clock units each having a different but regular interval in order to obtain quasistatistically distributed interval periods. Even when several clock generators are used, the energy consumption of these elements, which is 1 $\mu$A on the average, is considerably lower than the consumption value of the various detector elements, which is at least 10 $\mu$A or more, depending on the type of detector.

FIG. 2 shows an apparatus provided with several detector elements 4, 8, 9, 10. Detector element 4, for example a vibration indicator, is operated in clocked operation in the form described above. The element is adjusted sensitively enough to detect even the smallest disturbances. When this element reacts to an external disturbance, the supply line for the further detectors 8–10 is closed via a switch element 11 in order to activate further detectors to check other marginal conditions, for example temperature or the penetration of light into the housing. If the evaluation of at least one of the further detector elements leads to the result that attempted penetration is involved, erasure of the memory is occasioned. As already mentioned, the further detector elements may be, for example, a housing wall safety device with integrated protective leads as mentioned at the outset, a thermometer probe, a light sensor, etc. The assortment of detector elements may be expanded as one chooses, depending on the necessity of safety precautions. As provided in FIG. 2, the disturbance detected by detector element 4 may be subjected to a further analysis in order to obtain more precise information on the cause of the disturbance. This can be done, for example, by having the vibration indicator not react immediately to a single vibration but only after a certain number within a predetermined not of time, for example three signals within a minute. If the more precise analysis shows that attempted penetration is involved, the erase signal is generated independently of the other detector elements.

Detector elements 8, 9 and 10 are switched back to their waiting positions after a certain period of time if the indications of attempted penetration are not confirmed, so that again only detector element 4 is in operation.

According to the circuit diagram shown in FIG. 3, a distributor unit 15 is inserted between clock generator 6 and detector elements 12, 13 and 14, the number of which may be adapted to the particular requirements at hand. This distributor unit supplies the various detector elements with energy alternatingly. With each clock pulse from the clock generator, or after a certain number, a different detector element is set into operation. The selection of which detector element is set into operation may take place according to a permanently wired sequence, or is determined by a randomizer connected with the distributor unit and not shown in the Figure. Since the detector elements are naturally designed to detect different results or signals, global protection covering a great variety of possible events is obtained, thereby attaining a high degree of security with only a slight load on the sources of energy.

As already shown above, the erasure of the memory contents may be controlled in this case as well in such a way that the further detector elements are activated when one detector element has responded. The erase signal is then generated after corresponding analysis of the results of all detector elements. The erasure of the memory contents may be carried out only when all detector elements have responded or else after a majority decision. It is also possible to weigh the various detectors differently.

The detector elements are preferably controlled in such a way that they provide a signal at regular intervals to a so-called "dead man" circuit in their "normal state", i.e. when there is no distribance. If the detector element responds to an external disturbance, this signal is interrupted and the erasure of the memory then initiated via the "dead man" circuit. This "dead man" circuit is connected with the clock unit to be coordinated with the clocked operation of the detector elements, and also supervises the functioning of the clock unit. In this manner an erase signal is generated even if one of the detector elements or the clock unit breaks down for technical reasons, so that the memory contents are no longer accessible in such a case either.

If the safety precautions described here are used to protect the memory contents of permanent, "non-transient" memories which work independently of an energy source, one may dispense with grounding the supply line and instead transmit a command to this memory which modifies the memory contents in such a way that the original information is no longer available.

Thus, the inventive solution allows devices to be equipped with complex and extensive safety measures involving low energy consumption and thus low battery capacity. The clocked operation of at least those safety measures involving high energy consumption thus allows for a high degree of security to be achieved over a long period of time, thereby banishing the problem of long periods of storage before these devices are ultimately used.

I claim:

1. An apparatus for protecting information from unauthorized access, comprising a housing in which a storage medium containing the information is provided, detector means for detecting unauthorized access to the interior of the housing, means for initiating erasure of the secret information when the detector means reacts, a battery inside said housing for supplying energy at least to the detector means, clock means connected to said detector means which is arranged to enable operation of the detector means only over interrupted predetermined time intervals and wherein randomizer means are provided for varying the predetermined time intervals in accordance with randomized statistical distribution principles.

2. The apparatus as in claim 1, wherein said detector means comprises several detector elements, only one of which at a time is enabled at predetermined time intervals by the clock means, and including a switch means for enabling the normally non-enabled detector elements when irregular marginal conditions are present indicating an unauthorized attempt to gain access.

3. The apparatus as in claim 1, including means for analyzing the signals evoking response of the detector means.

4. The apparatus as in claim 1, wherein said detector means includes several detector elements and, including a switching element for combining the signals of several detector elements with each other, and means responsive to said signals for determining whether erasure of the memory is necessary.

5. The apparatus as in claim 4, wherein said means responsive to the signals is arranged to initiate erasure only according to the condition of a majority of detector elements.

6. The apparatus as in claim 4, wherein the switching element is arranged to assess the detector elements according to a different weighting and to determine the erasure decision based on such weighting.

7. The apparatus as in claim 1, wherein said secret information is maintained in said storage medium by the energy supplied by said battery.

8. An apparatus for protecting information from unauthorized access comprising a housing in which a storage medium containing the information is provided, detector means for detecting unauthorized access to the interior of the housing, means for initiating erasure of the secret information when the detector means reacts, and a battery inside said housing for supplying energy at least to the detector means, clock means connected to said detector means which is arranged to enable operation of the detector means only over interrupted predetermined time intervals, wherein said detector means comprises several detector elements, a distributor means, the latter including means for enabling said detector elements at said predetermined time intervals alternatingly, a randomizer means, and wherein said distributor means is arranged to cooperate with the randomizer means to enable selection of the detector element to be enabled.

9. The apparatus as in claim 8, including switch means arranged to enable further detector elements when the detector element in operation at the moment reacts to unauthorized access to the interior of the housing.

10. The apparatus as in claim 8, including means for analyzing the signals evoking response of the detector means.

11. The apparatus as in claim 8, wherein said detector means includes a switching element for combining the signals of several detector elements with each other, and means responsive to said signals for determining whether erasure of the memory is necessary.

12. The apparatus as in claim 11, wherein said means responsive to the signals is arranged to initiate erasure only according to the condition of a majority of detector elements.

13. The apparatus as in claim 11, wherein the switching element is arranged to assess the detector elements according to a different weighting and to determine the erasure decision based on such weighting.

14. The apparatus as in claim 8, wherein said information is maintained in said storage medium by the energy supplied by said battery.

* * * * *